United States Patent [19]

Amoh

[11] Patent Number: 5,267,639
[45] Date of Patent: Dec. 7, 1993

[54] DEVICE FOR CONTINUOUSLY FEEDING KICK SPRINGS

[75] Inventor: Mikuni Amoh, Anan, Japan

[73] Assignee: Kitano Shoji Kabushiki Kaisha, Tokushima, Japan

[21] Appl. No.: 12,423

[22] Filed: Feb. 2, 1993

[30] Foreign Application Priority Data

Mar. 24, 1992 [JP] Japan .................. 4-015395[U]

[51] Int. Cl.$^5$ .............................. B65G 27/00
[52] U.S. Cl. ........................ 198/391; 198/953; 221/200; 221/167
[58] Field of Search .............. 198/391, 953; 221/200, 221/167, 168, 171

[56] References Cited

U.S. PATENT DOCUMENTS

| 2,832,462 | 4/1958 | Simer | 221/200 |
| 3,042,181 | 7/1962 | Rise | 198/391 |
| 3,347,414 | 10/1967 | Daine | 221/200 |
| 4,739,873 | 4/1988 | Yajima | 198/391 |

Primary Examiner—H. Grant Skaggs
Attorney, Agent, or Firm—Wenderoth, Lind & Ponack

[57] ABSTRACT

A device for continuously feeding kick springs. It has a bowl adapted to be vibrated in a circumferential direction and provided in its inner peripheral surface with a spiral track. An arcuate guide is connected to the top end of the track. A vibration feeder is provided to bring one of two bent pieces at both ends of each kick spring into engagement with an inner edge of the arcuate guide and to feed the kick springs continuously while keeping their attitude substantially horizontal. A chute has one side thereof connected continuously to the inner edge of the guide for feeding the kick springs in one direction keeping one of the two bent pieces of each kick spring facing one side of the chute. The chute is provided on the top surface thereof with a guide surface for guiding one of kick legs of each kick spring and a guide groove for receiving a coiled portion and the other kick leg. A presser plate is provided over the chute and provided on the bottom surface thereof with a protrusion received in the guide groove for guiding the coiled portions in cooperation with one side of the guide groove. The protrusion is provided on the bottom surface thereof with an insert groove for receiving the other bent piece.

1 Claim, 4 Drawing Sheets

DEVICE FOR CONTINUOUSLY FEEDING KICK SPRINGS

This invention relates to a device for continuously feeding kick springs.

As shown in FIG. 6, a 3.5-inch floppy disk comprises a hard case 1 and a memory means 2. The hard case 1 has a read/write window 3 and is provided with a slidable shutter 4 which is normally biassed by a kick spring A to close the window 3.

As shown in FIG. 7, a kick spring A of this type comprises a coiled portion 5, a pair of kick legs 6a, 6b extending from both ends of the coiled portion 5 and bent pieces 7a, 7b extending from the tips of the kick legs 6a, 6b in opposite directions.

The mounting of kick springs A into the hard case 1 is automated. When mounting them, the position of the kick springs A has to be adjusted to a uniform position.

In order to feed a plurality of kick springs A one by one without interruption while keeping them uniformly orientated, a bowl type vibration feeder is ordinarily used. Since the vibration feeder is installed at a position apart from the position at which the kick springs are mounted, the kick springs discharged from the vibration feeder have to be transported to the mounting position.

Heretofore, a chute was connected to the vibration feeder to supply the kick springs discharged from the feeder to the mounting position.

This type of continuous feed device comprising the vibration feeder and the chute connected to the feeder has a problem in that the individual kick springs tend to incline in different ways and get tangled with adjacent springs while being fed through the chute. In other words, it was difficult to feed kick springs one by one while keeping them uniformly orientated.

It is an object of this invention to provide a continuous feed device which is free of the above drawbacks and which is capable of positively and continuously feeding kick springs one by one.

In order to solve the above problems, according to this invention, there is provided a device for continuously feeding kick springs having a coiled portion, a pair of kick legs and a pair of bent pieces extending from the kick legs in opposite directions, the device comprising a bowl-shaped vibration feeder provided on the inner peripheral surface thereof with a spiral track and having an arcuate guide connected to the top end of the track, the vibration feeder being adapted to be vibrated in a circumferential direction to feed kick springs along the track to top end thereof, move them onto the guide with the bent piece of each kick spring engaged to an inner edge of the guide, feed them along the guide and discharge them from the vibration feeder while keeping their position substantially horizontal, a chute having one side thereof connected continuously to the inner edge of the guide for feeding the kick springs in one direction keeping one of the two bent pieces of each kick spring facing one side of the chute, the chute being provided on the top surface thereof with a guide surface for guiding one of the kick legs of each kick spring and a guide groove for receiving the coiled portion of each kick spring and the other kick leg of each kick spring, and a presser plate provided over the chute and provided on the bottom surface with a protrusion received in the guide groove of the chute for guiding the coiled portions of the kick springs in cooperation with one side of the guide groove, the protrusion being provided on the bottom surface thereof with an insert groove for receiving the other bent piece of each kick spring.

With this arrangement, when kick springs are fed through the chute, their coil portions are guided along the passage defined by the corresponding sides of the protrusion and the guide groove while one of the bent pieces of each kick spring is guided by the insert groove. In other words, each kick spring is guided at two points. Thus, the kick springs can keep a uniform, predetermined position stably at all times. The presser plate serves to keep the kick springs pressed against the chute. Thus, the kick springs will never tangle with each other while being fed and can be fed one by one reliably.

As described above, the continuous feed device for feeding kick springs according to this invention is characterized in that a guide groove is formed in the top surface of the chute, that the pressure plate is provided with a protrusion adapted to be received in the guide groove, whereby a passage for guiding the kick springs is defined between the corresponding sides of the protrusion and the guide groove, and that an insert groove is formed in the bottom surface of the protrusion to guide one of the bent pieces of each kick spring. With this arrangement, each kick spring is guided while kept supported at two points, maintaining a uniform, predetermined position. Thus, the kick springs can be fed one by one continuously and positively without tangling with each other.

Other features and objects of the present invention will become apparent from the following description taken with reference to the accompanying drawings, in which.

Figure 1:
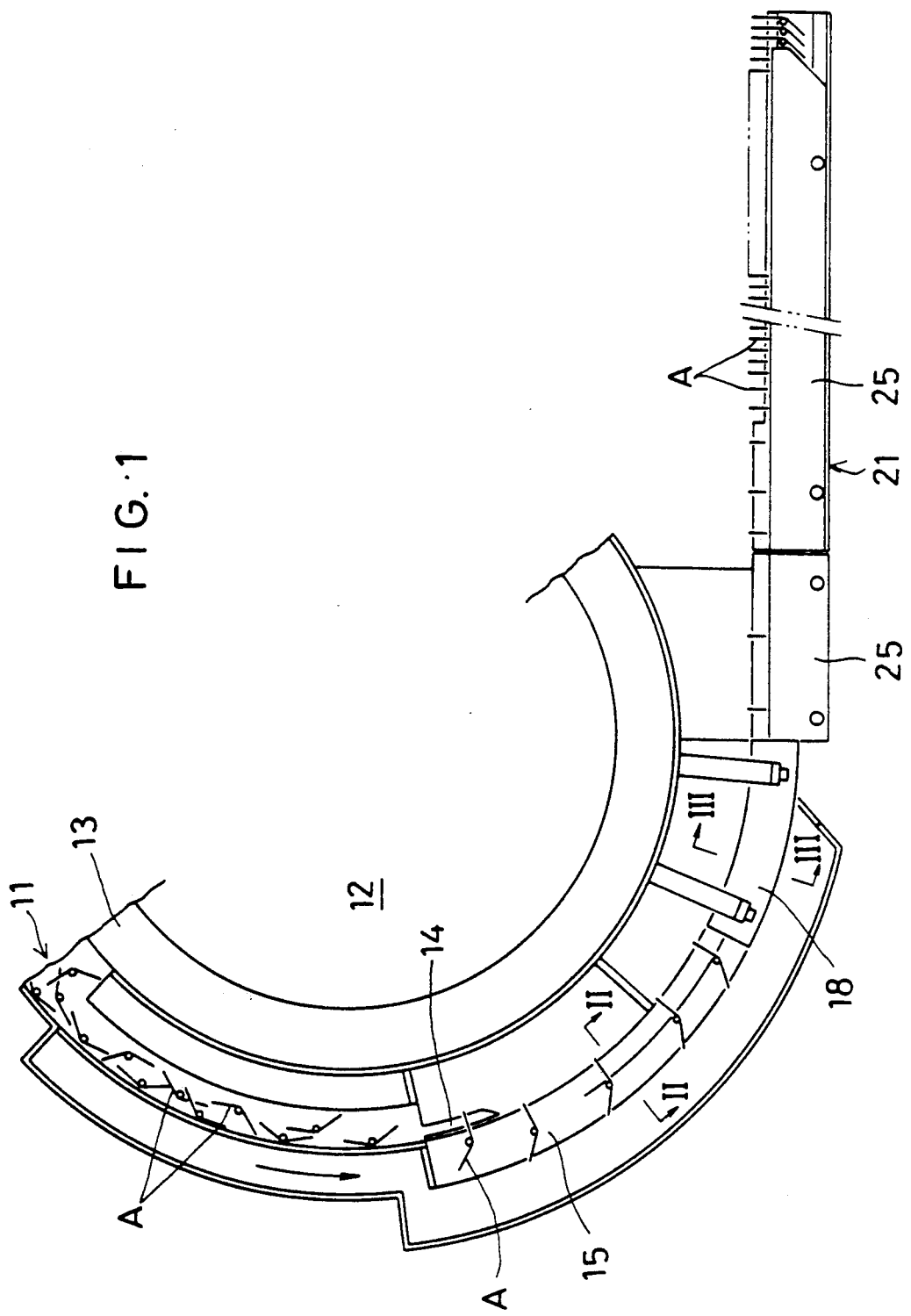
FIG. 1 is a partially cutaway plan view of one embodiment of the continuous feed device according to this invention.

As shown in FIG. 1, the feed device according to the present invention for continuously feeding kick springs comprises a vibration feeder 11 and a chute 21 connected to the vibration feeder 11.

A spiral track 13 is formed in the inner peripheral surface of a bowl 12 of the vibration feeder 11 to which vibrations are given. A guide piece 14 is provided at the upper end of the track 13. An arcuate guide 15 is connected to the track 13 along the outer edge of the guide piece 14. The track 13 is tapered so that its inner edge is located higher than its outer edge.

Figure 7:
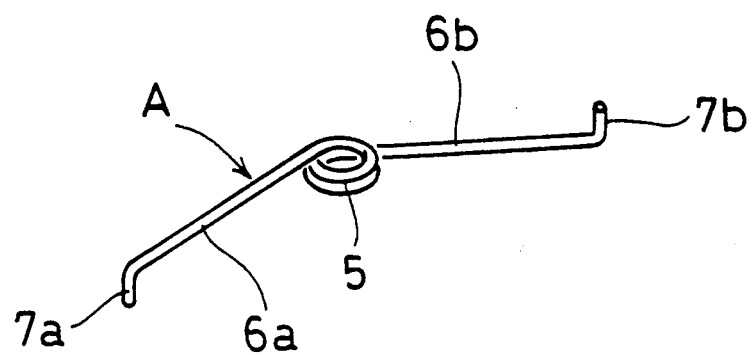
FIG. 7 is a perspective view of a kick spring.

Kick springs A shown in FIG. 7 are accommodated in the bowl 12 and moved up through the track 13 in the direction of arrow of FIG. 1 by the vibration imparted to the bowl 12. Only those kick springs A whose bent pieces 7a or 7b have been caught by the inner edge of the guide piece 14 are supported on the arcuate guide 15 and carried along it.

For the convenience of description only, we assume hereinafter that the bent pieces 7a are to be caught by the inner edge of the guide piece 14.

Figure 2A:
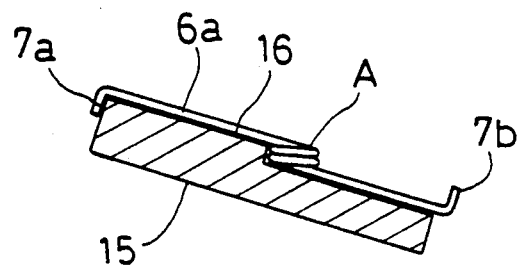
FIG. 2(a) is a sectional view taken along line of FIG. 1.
Figure 2B:
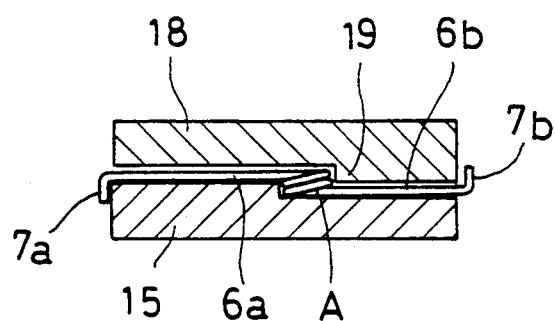
FIG. 2(b) is a sectional view taken along line of FIG. 1.

At one end of guide 15 near the track 3, its top surface is tapered so that its inner edge is higher than its outer edge as shown at 16 in FIG. 2a. The angle of the tapered surface decreases gradually in the direction of feed of kick springs so that at the other end of the guide 15, its top surface will substantially level out as shown in FIG. 2b.

When the kick springs A move onto the guide 15, their bent pieces 7a engage the inner edge of the guide 15 and thus their position is restricted. The kick springs A are moved along the guide 15, keeping their bent pieces 7a engaged by the inner edge of the guide 15. At the other end of the guide 15, the kick springs substantially level out.

In order to feed the kick springs A with their bent pieces 7a engaged by the inner edge of the guide 15, the top surface of the guide 15 is stepped widthwise within an area between its longitudinally intermediate portion and the other end. The kick legs 6a of the kick springs A are guided along the higher side 16 of the stepped surface.

A presser bar 18 is provided over the guide 15 at a portion near the other end thereof. It is provided with a protuberance 19 on its underside to prevent separation of the kick legs 6b from the guide 15.

The chute 21 extends in a tangential direction of the arcuate guide 15 while sloping downwards toward its delivery end. The chute 21 has a width larger than the width of the guide 15 and one side thereof is connected continuously to the inner edge of the guide 15.

Figure 3:
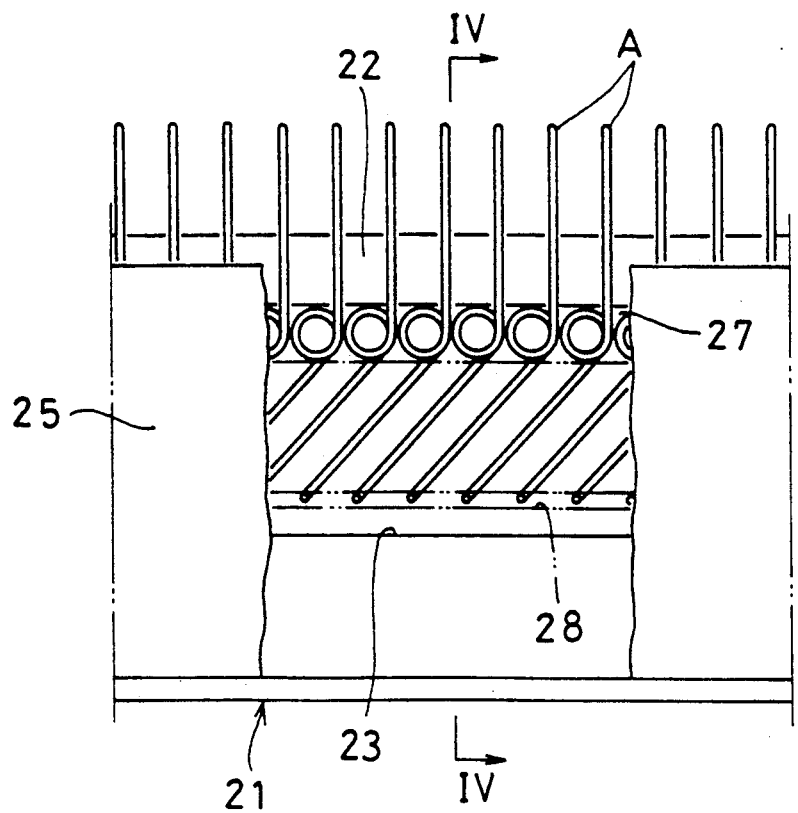
FIG. 3 is a partially enlarged, partially cutaway plan view of FIG. 1.
Figure 4:
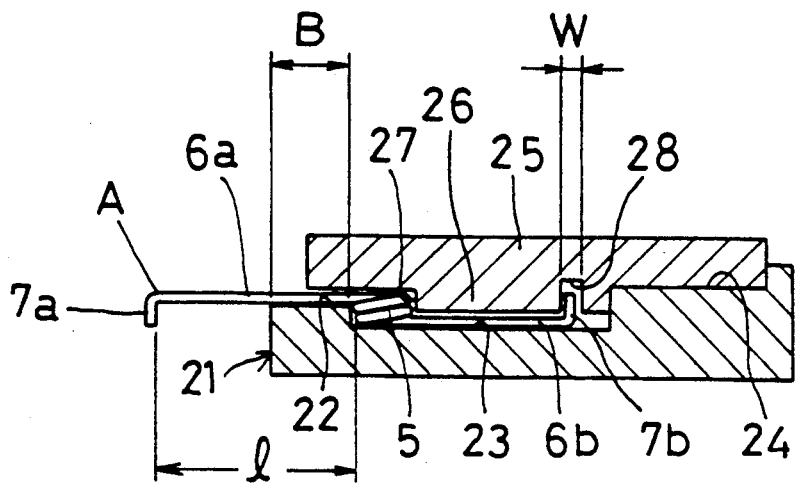
FIG. 4 is a sectional view taken along line of FIG. 3.
Figure 5:
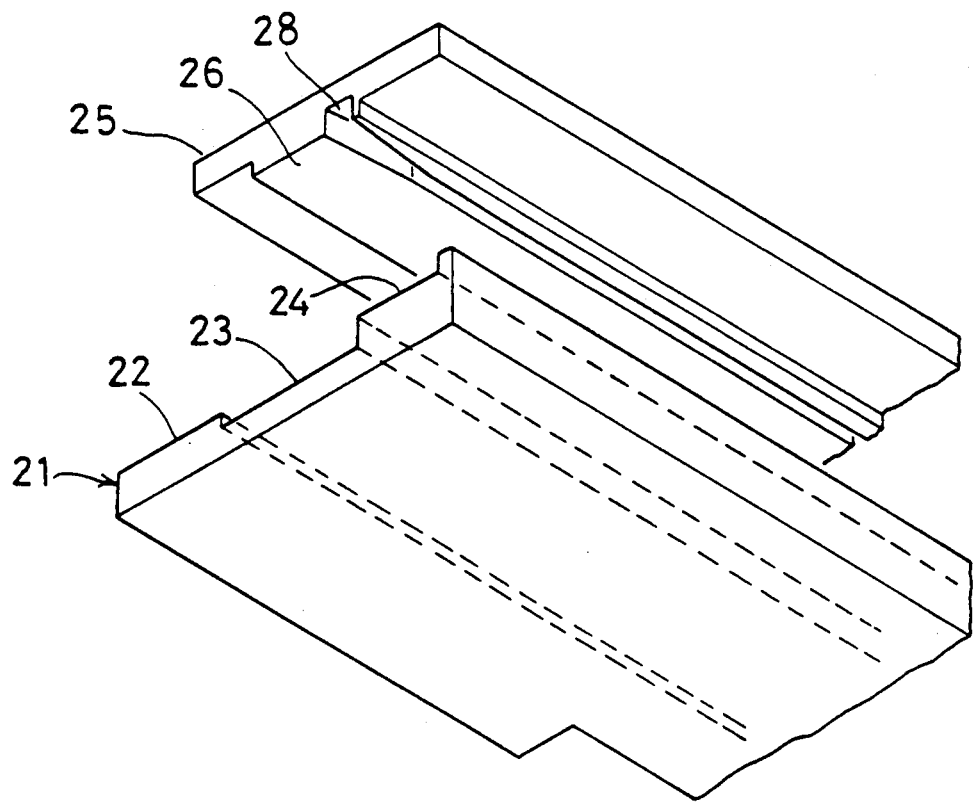
FIG. 5 is an explosive perspective view of a portion of the chute and the presser plate of the same.
Figure 6:
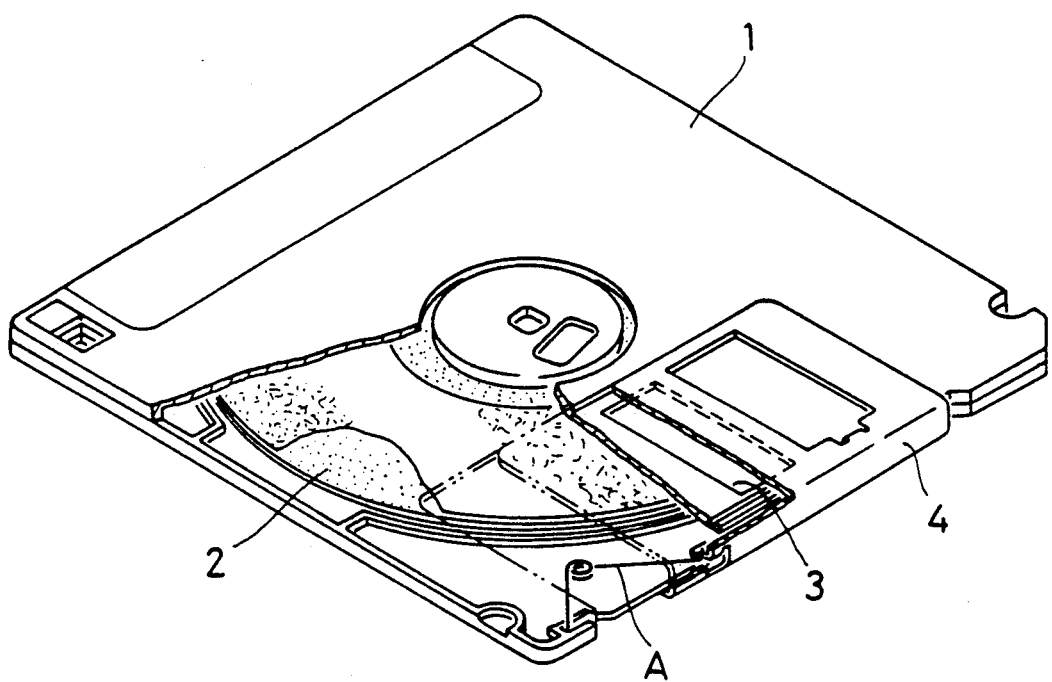
FIG. 6 is a partially cutaway perspective view of a floppy disk.

As shown in FIGS. 3-5, the top surface of the chute 21 comprises a guide surface 22 for guiding the kick legs 6a of the kick springs A, a guide groove 23 formed at one side of the guide surface 22 and a mounting surface 24 formed at the other side of the guide groove 23.

The difference in heights between the guide surface 22 and the bottom surface of the guide groove 23 is equal to the length of the kick springs A. The coiled portions 5 and the kick legs 6b of the kick springs A are guided along the bottom surface of the guide groove 23.

When the kick springs A are fed onto the chute 21 from the guide 15 of the vibration feeder 11, the bent pieces 7a face one side of the chute 21 and the kick legs 6a continuous with the bent pieces 7a are supported on the guide surface 22. Also, the coiled portions 5 and the kick legs 6b are fitted in the guide groove 23. The kick springs are fed toward the delivery end of the chute 21 maintaining this state.

If the width B of the guide surface 22 were equal to the length between the outer periphery of the coiled portion 5 and the bent pieces 7a, the bent pieces 7a would come into contact with one side of the chute 21 and the coiled portions 5 come into contact with the side of the guide groove 23, thereby making it difficult to feed the kick springs A smoothly. Thus, the width B of the guide surface 22 has to be smaller than the distance between the outer periphery of the coiled portion 5 and the bent piece 7a. With this arrangement, the guide surface 22 would not restrict the position of the kick springs A.

Over the chute 21 is provided a presser plate 25, which is secured to the chute 21 by tightening screws into the mounting surface 24 of the chute 21. As shown in FIGS. 4 and 5, the presser plate 25 is provided on the underside thereof with a protrusion 26. A passage 27 for guiding the feed of the coiled portions 5 is defined between one side of the protrusion 26 and the corresponding side of the guide groove 23.

The bottom surface of the protrusion 26 has an insert groove 28 for guiding the bent pieces 7b provided on the kick pieces 6b of the kick springs A. The insert groove 28 has a width w slightly greater than the wire diameter of the kick springs A. The insert groove 28 is widened at its inlet end so that the kick springs A fed from the guide 5 can enter the groove 28 without a hitch.

As described above, by forming the protrusion 26 on the presser plate 25 and providing the insert groove 28 in the bottom surface of the protrusion 26, the coiled portions 5 of the kick springs A are guided along the passage 27 defined by the sides of the protrusion 26 and the guide groove 23. Each kick spring A is thus guided, supported at two points, maintaining uniform, predetermined position. Thus, the kick springs can be fed one by one positively without tangling with each other.

In the embodiment, the kick springs A that have been fed onto the chute 21 are slid down along the down-sloped chute 21. But in an actual application, a straight-feed type vibration feeder is connected to the chute 21 to move the kick springs A straight ahead.

In the example shown in FIG. 1, the presser plate 25 is longitudinally divided in two. But it may be a one-piece member.

What is claimed is:

1. A device for continuously feeding kick springs having a coiled portion, a pair of kick legs and a pair of bent pieces extending from the kick legs in opposite directions, said device comprising a bowl-shaped vibration feeder provided on the inner peripheral surface thereof with a spiral track and having an arcuate guide connected to the top end of said track, said vibration feeder being adapted to be vibrated in a circumferential direction to feed kick springs along said track to top end thereof, move them onto said guide with one of the bent pieces of each kick spring engaged to an inner edge of said guide, feed them along said guide and discharge them from said vibration feeder while keeping their position substantially horizontal, a chute having one side thereof connected continuously to said inner edge of said guide for feeding the kick springs in one direction keeping one of said two bent pieces of each kick spring facing one side of said chute, said chute being provided on the top surface thereof with a guide surface for guiding one of the kick legs of each kick spring and a guide groove for receiving the coiled portion of each kick spring and the other kick leg of each kick spring, and a presser plate provided over said chute and provided on the bottom surface with a protrusion received in said guide groove of said chute for guiding the coiled portions of the kick springs in cooperation with one side of said guide groove, said protrusion being provided on the bottom surface thereof with an insert groove for receiving the other bent piece of each kick spring.

* * * * *